United States Patent [19]

Noda et al.

[11] Patent Number: 4,577,078
[45] Date of Patent: Mar. 18, 1986

[54] APPARATUS FOR PREHEATING MOLD RESIN FOR A SEMICONDUCTOR DEVICE

[75] Inventors: Yasumasa Noda, Kawasaki; Yoichi Suzuki, Sagamihara, both of Japan

[73] Assignee: Kabushiki Kaisha Toshiba, Kawasaki, Japan

[21] Appl. No.: 615,463

[22] Filed: May 30, 1984

[30] Foreign Application Priority Data

May 31, 1983 [JP] Japan .................................. 58-96026
May 31, 1983 [JP] Japan .................................. 58-96027

[51] Int. Cl.$^4$ ............................................. H05B 6/64
[52] U.S. Cl. ...................... 219/10.55 A; 219/10.55 F; 34/1; 264/25
[58] Field of Search ................. 219/10.55 A, 10.55 F; 34/1; 264/24, 25, 26, 27, 567, DIG. 65

[56] References Cited

U.S. PATENT DOCUMENTS

| | | | |
|---|---|---|---|
| 3,529,115 | 9/1970 | Jawor | 219/10.55 A |
| 3,764,768 | 10/1973 | Sayer, Jr. | 219/10.55 A |
| 3,999,026 | 12/1976 | Böling | 219/10.55 A |
| 4,023,279 | 5/1977 | Janda | 219/10.55 A X |
| 4,045,638 | 8/1977 | Chiang et al. | 219/10.55 A |
| 4,099,042 | 7/1978 | Jean et al. | 219/10.55 A |
| 4,128,751 | 12/1978 | Sale | 219/10.55 A |
| 4,144,434 | 3/1979 | Chiron et al. | 219/10.55 F |
| 4,160,144 | 7/1979 | Kashyap et al. | 219/10.55 A |
| 4,401,873 | 8/1983 | Berggren et al. | 219/10.55 A |

*Primary Examiner*—C. L. Albritton
*Assistant Examiner*—M. M. Lateef
*Attorney, Agent, or Firm*—Schwartz, Jeffery, Schwaab, Mack, Blumenthal & Evans

[57] ABSTRACT

Preheating apparatus for use in a semiconductor molding apparatus for preheating mold resin before the mold resin is charged in a mold comprises a microwave generator generating a microwave, a waveguide connected to the microwave generator, and a positioning device for positioning the mold resin in such a manner that the center of the mold resin coincides with the position of a peak of the distribution of the electric field intensity due to the microwave.

12 Claims, 14 Drawing Figures ns of the cross section of the waveguide;

APPARATUS FOR PREHEATING MOLD RESIN FOR A SEMICONDUCTOR DEVICE

BACKGROUND OF THE INVENTION

The present invention relates to apparatus for preheating mold resin suitable for incorporation in molding apparatus used for manufacture of semiconductor devices such as central processing units or microprocessors of computer systems or memory devices.

An example of semiconductor molding apparatus is formed, as shown in FIG. 1, to mold, by means of molding resin 2, semiconductor pellets (not shown) mounted on lead frames 1 to provide protection for the pellets.

As illustrated in FIG. 2, the semiconductor molding apparatus may comprise an upper mold die 3 and a lower mold die 4 forming a pair with each other, and a lead frame loader 5 movable in and out of between the upper and the lower molds dies 3 and 4 to carry a lead frame in and out, and a tablet loader 7 for supplying pots 6 (FIG. 3) provided in the lower mold die 4, with tablets, each of which is formed of molding resin and has a shape of rod or the like.

FIG. 3 is a plan view of the lower mold die 4. As illustrated, a plurality of cavities 8 are provided on the surface of the lower mold die 4. In the illustrated example, the cavities are arranged in two rows (horizontal alignments as viewed in FIG. 3) and four columns (vertical alignments as viewed in FIG. 3). Provided between the cavities 8 of the same columns are pots 6 for charging the resin. The upper mold die 3 has cavities (not shown) provided on the lower surface thereof at positions conforming to the cavities 8 of the lower mold die 4. Gates 9 are provided to transfer resin in a fluid state from the respective pots 6 to the adjacent cavities 8.

In operation, the lower mold die 4 is lowered, and a lead frame loader 5 is inserted between the upper and the lower mold dies 3 and 4 to carry a lead frame 1 into position in the lower mold die 4. The lead frame loader 5 is then withdrawn and a tablet loader 7 carries tablets in and drops them into the respective pots 6. By then, the lower mold die 4 is heated to a temperature (e.g., 180° C.) sufficient to melt the tablets into a fluid state. The tablet loader 7 is then withdrawn, and the lower mold die 4 is elevated to mate with the upper mold die 3. Cavities of the desired shape corresponding to the shape of the resin portion 2 of FIG. 1 are formed at the mating surfaces of the upper and the lower mold dies 3 and 4 by the cavities 8 of the lower mold die 4 and the corresponding cavities of the upper mold die 3. Plungers (not shown) disposed in the pots 6 are then moved upward to push up the fluid resin so that the fluid resin is injected through the gates 9 into the cavities. After the injection is completed the resin is set or cured in a short time because of its thermo-setting property. The lower mold die 4 is thereafter lowered (being separated from the upper mold die) and the resin-molded semiconductor devices as shown in FIG. 1 are taken out. Thus the molding process is completed.

With the above-described molding apparatus, it takes several seconds or ten and several seconds until the tablets are heated to a melting temperature (170°–190° C.) after being introduced in the pots 6. The time necessary for the heating varies depending on the dimensions of the tablet. The time needed for the resin to be cured after it is introduced into the pots should be preferably shorter from a viewpoint of productivity, i.e., to reduce the molding cycle time. The concentration of cure accelerator in the resin may be increased to reduce the time necessary for the curing, but this will degrade the water resistance of the product. The time for heating the resin tablets should be sufficient. If it is insufficient, longer formation time may be necessary or wire deformation may occur. These are particularly problematical in the manufacture of a large-scale device such as a microprocessor. If the heating temperature is raised, the heating time can be reduced, but the formation conditions become unstable and some cavities may not be completely filled with the resin.

To solve the above-described problems, tablets may be preheated before they are introduced in the pots to such a degree that they are in a semi-melted state. The preheating can be effected by means of high frequency (e.g., 70 MHz, or 570 MHz) heating. But this method has a limitation in that the heating electrodes must be scaled to the small size of the tablets and must be positioned in the proximity of the respective tablets to attain uniform pre-heating.

SUMMARY OF THE INVENTION

An object of the invention is to provide preheating apparatus capable of preheating mold resin easily and uniformly before the mold resin is introduced in the mold die, regardless of the particular form of the resin (whether it is in the form of tablets or powder) and of the size of the tablet.

Another object of the invention is to enable simultaneous preheating of a plurality of supplies of mold resin, the respective supplies being intended for filling a plurality of pots.

A further object of the invention is to provide preheating apparatus which can be readily combined with or incorporated in molding apparatus and is suitable for automating of introduction of mold resin into the mold die.

A still further object of the invention is to enable reduction of the molding cycle time of molding semiconductor devices.

According to the invention, there is provided preheating apparatus for use in a semiconductor molding apparatus for preheating mold resin before the mold resin is charged in a mold die, comprising a microwave generator generating a microwave, a waveguide connected to the microwave generator, and a positioning device for positioning the mold resin in such a manner that the center of the mold resin coincides with the position of a peak of the distribution of the electric field intensity due to the microwave.

DESCRIPTION OF THE PREFERRED EMBODIMENTS

Figure 4:
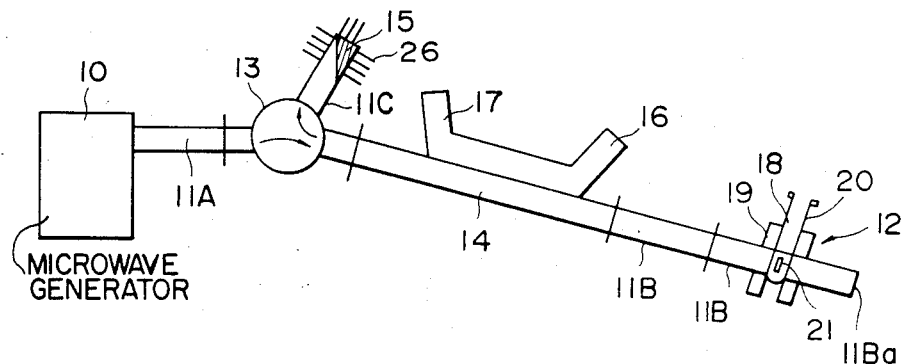
FIG. 4 is a schematic diagram showing an embodiment of the preheating apparatus according to the invention.

FIG. 4 shows an embodiment of the invention. The preheating apparatus of this embodiment comprises a microwave generator 10 generating a microwave, e.g., of 2450 MHz, waveguides 11A, 11B and 11C connected to the microwave generator 10, and a positioning device 12 for carrying in and positioning a tablet in the waveguide 11B.

Figure 5A:
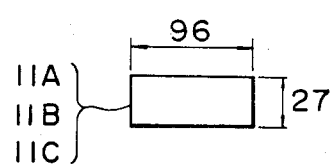
FIGS. 5(a) and 5(b) are diagrams showing the dimensions of the cross section of the waveguide.
Figure 5B:
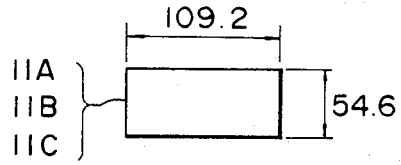

The microwave generator 10 may comprise a magnetron and an electric power source. The waveguides 11A, 11B and 11C may be rectangular waveguides of $TE_{10}$ mode. As an example, internal dimensions of the cross section are shown in FIGS. 5(a) and 5(b). The three waveguides 11A, 11B and 11C are connected to each other by a circulator 13 which prevents the reflected microwave from interferring with the generated microwave from the generator 10. More specifically, the circulator 13 is of the three port type. The input port is connected through the waveguide 11A (input waveguide) to the microwave generator 10 while one of the output ports is connected through a directional coupler 14 to the waveguide 11B (output waveguide). In the embodiment, the end 11Ba of the waveguide 11B is formed of a short-circuiting plate and constitutes a perfect reflection end so that the reflected microwave is again supplied for heating the mold resin positioned in the waveguide 11B in a manner described later. With this reflection, the irradiating power is increased. Moreover, the reflection produces a standing wave in the waveguide 11B, and by suitable positioning of the mold resin, the irradiating power is further increased.

A second output port is connected to a waveguide 11C for absorbing the reflected wave. For this purpose, a reflectionless terminator 15 is provided at the end of the waveguide 11C. Radiating fins 26 are provided to cool the terminator 15. Connected to the directional coupler 14 are an input power detector 16 and a reflected power detector 17, which are used for regulation of the power of the radiation on the mold resin.

Figure 6:
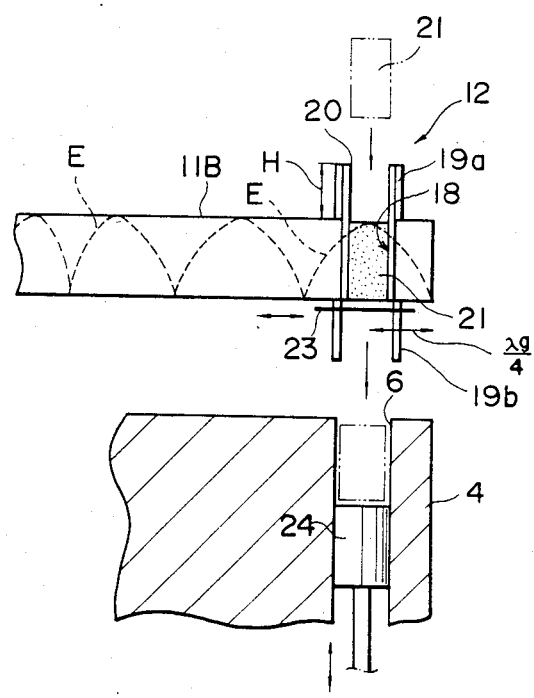
FIG. 6 is a sectional view showing an example of positioning device.

As is best illustrated in FIG. 6, the positioning device 12 comprises a cylindrical retainer 20 fitted in perforations in the upper and the lower walls of the waveguide 11B and extending vertically through the waveguide 11B. The inner surfaces of the cylindrical retainer 20 defines a retaining hole 18 for accommodating and positioning the mold resin in the form of a tablet 21. The cylindrical member 18 is so positioned that the center of the tablet 21 coincides with a peak of distribution of the electric field intensity formed in the waveguide 11B. More particularly, the center of the tablet 21 is made to coincide with the position of the maximum value of the distribution of the electric field intensity along the lateral direction of the waveguide (the center of the width of the waveguide) and also with the position of an antinode of the standing wave of the electric field along the longitudinal direction of the waveguide. One of such antinodes is at a distance of $\lambda g/4$ from the reflecting end of the waveguide (where $\lambda g$ represents the wavelength of the microwave within the waveguide), and, in the illustrated example, the center of the tablet 21 is made to coincide the position of the antinode which is closest to (at $\lambda g/4$ from) the end 11Ba. By having the center of the tablet coincide with the peak of the distribution of the electric field intensity, the irradiating power applied to the tablet 21 is increased, and the heating temperature in the central (internal) area of the tablet 21 becomes higher than the heating temperature in the peripheral (outer area of the tablet 21. Consequently, it is possible to eliminate the delay in the increase of the temperature in the internal area, while the peripheral area is maintained in a semi-solid state, so that deformation can be avoided and handling of the tablet in introducing it into the pot of the mold die is simplified.

The cylindrical retainer 20 is formed of a heat-resisting, non-metallic material such as polytetrafluoroethylene (also known as a trademark "Teflon"). Cylindrical chokes 19a and 19b are mounted on the outer surfaces of the upper and the lower walls of the waveguide 11B in alignment with the cylindrical retainer 20. The height H of the upper choke 19a (precisely speaking, this height should be measured from the inner surfaces of the walls) is preferably 50 mm to prevent the leakage of the microwave. In the illustrated embodiment, the cylindrical retainer 20 extends upwardly to the same height as the upper cylindrical choke 19a and is covered by the choke 19a. The lower choke 19b is provided with a shutter 23. When a tablet 21 is introduced in the cylindrical retainer 20, the tablet 21 is received on the upper surface of the shutter 23. Upon completion of the preheating of the tablet 21 in the retainer 20 the shutter 23 is opened, and the tablet 21 is dropped or guided into the pot 6 of the mold die 4, and is received by a plunger 24 in the pot 6. Thus it will be appreciated that feeding and preheating of the tablet can be readily automated.

Figure 7:
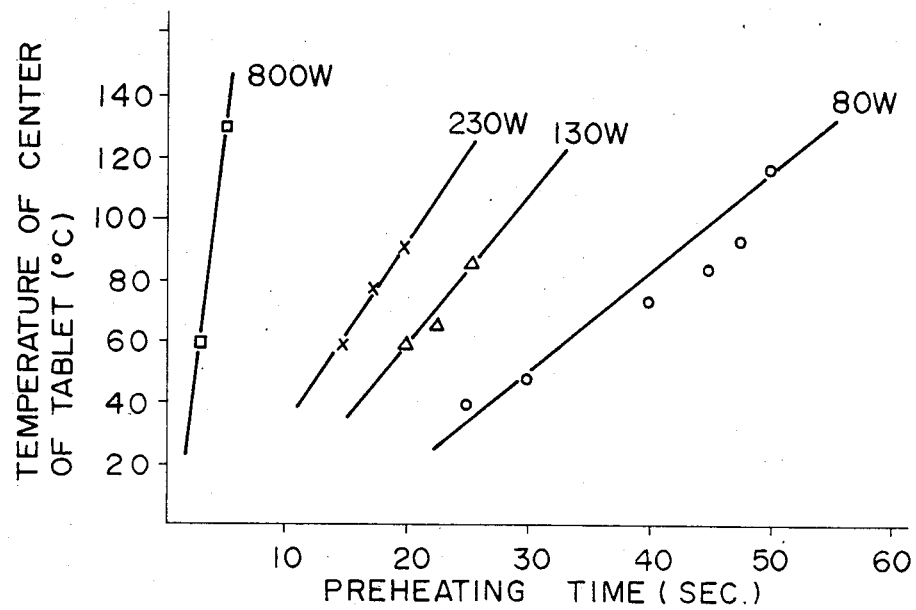
FIG. 7 is a graph showing the temperature of the central point of a tablet against the preheating time.

FIG. 7 shows a relationship between the temperature (° C.) of the central portion of the tablet and the preheating time (sec.) with the irradiation power taken as a parameter. Here, the frequency of the microwave is 2450 MHz, and the tablet has a diameter of 14 mm and weighs 3.8 g. As is seen from FIG. 7, the preheating can be achieved in a very short time and with a small energy. The forming cycle time can therefore be reduced. The supply power and the heating time can be adjusted to optimize the temperature increase characteristics.

Figure 8:
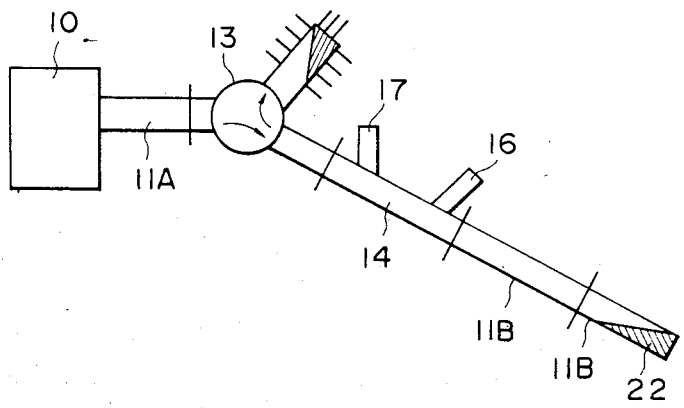
FIG. 8 is a schematic diagram showing another embodiment of the invention.

In the above-described embodiment, the end of the waveguide 11B is a perfect reflection end. But, there are occasions where a reflectionless end is preferred since the reflected wave may interfere with the wave directed from the generator to cause a disturbance in the distribution of the electric field. A second embodiment, as illustrated in FIG. 8, employs a waveguide 11B provided with a reflectionless terminator 22. The terminator 22 may be any one of those employing polyiron, ferrite, or the like.

In the above-described embodiments, a single retainer 20 is provided and a single tablet 21 is preheated at a time. But a from a viewpoint of productivity, it is desirable that a plurality of tablets 21 can be preheated simultaneously. A further embodiment of the invention shown in FIGS. 9 and 10 satisfies such a requirement.

Figure 9:
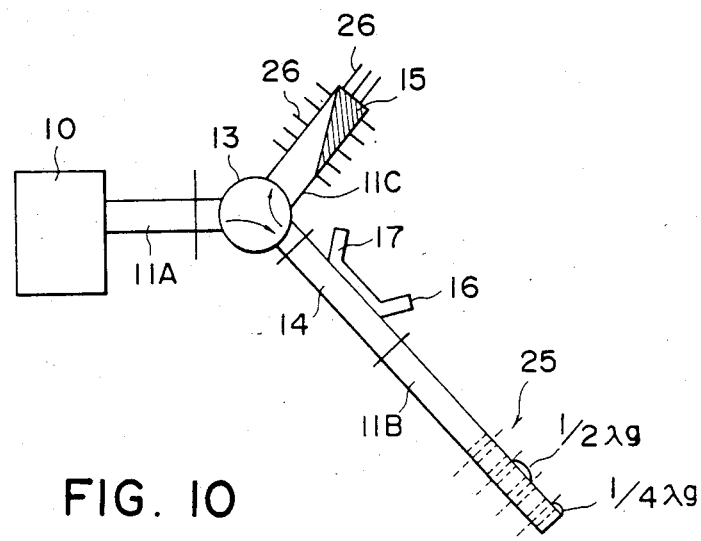
FIG. 9 is a schematic diagram of a further embodiment of the preheating apparatus suitable for preheating a plurality of tablets simultaneously.
Figure 10:
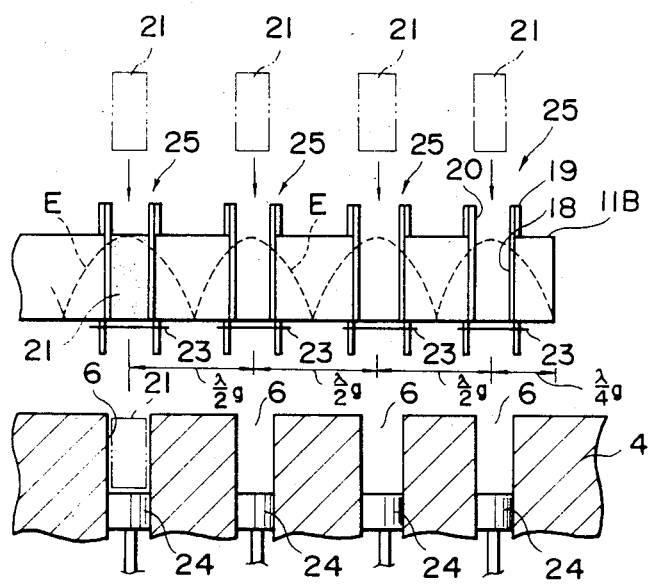
FIG. 10 is a sectional view of an example of positioning devices suitable for incorporation in the preheating apparatus of FIG. 9.

This embodiment employs, similarly as the embodiment of FIGS. 4 and 6, a perfect reflection end. FIG. 9 shows the general construction and FIG. 10 shows the details of the positioning devices. As illustrated, a plurality of positioning devices 25, each similar to the positioning device 12 of FIG. 6, are disposed to position a plurality of supplies of mold resin introduced in the respective positioning devices at positions of antinodes of the standing wave of the electric field along the length of the waveguide 11B. Such antinodes are $\lambda g/2$ apart from one another as illustrated.

Thus by using a perfect reflection end to produce a reflected wave and hence a standing wave, and positioning the supplies of resin at the respective antinodes, the heating efficiency is improved and all the supplies of resin are uniformly heated. It has been found that this uniformity is ensured even when tablets 21 are positioned at 6 positions.

Figure 11:
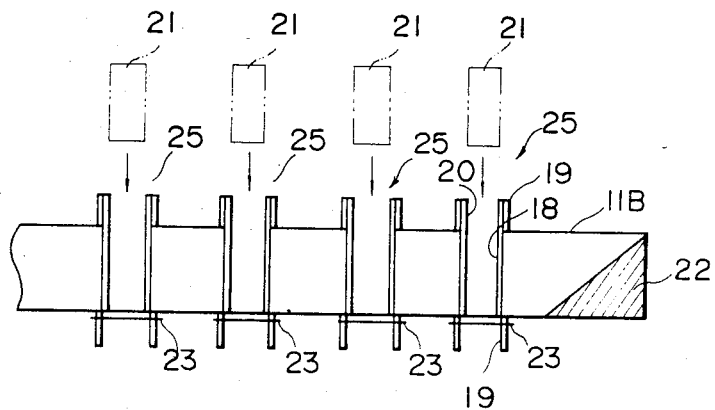
FIG. 11 is a sectional view showing an end of a waveguide formed of a reflectionless terminator.

FIG. 11 shows a further embodiment of the invention.

This embodiment is similar to the embodiment of FIGS. 9 and 10 in that it is capable of simultaneously preheating a plurality of tablets. It employs a reflectionless end in place of the perfect reflection end, and in that sense it differs from the embodiment of FIGS. 9 and 10 and resembles the embodiment of FIG. 8. The pitch of the positioning devices 25 is $\lambda g/2$ similarly as in the embodiment of FIGS. 9 and 10. The reason why the pitch is set at $\lambda g/2$ is that by doing so, peaks of the distribution of the electric field along the length of the waveguide appear at a pitch of the $\lambda g/2$ and at the same positions as the positioning device 25 so that the heating efficiency is improved.

The uniformity of heating is inferior as compared with the embodiment of FIGS. 9 and 10, but is satisfactory under certain circumstances.

Figure 12A:
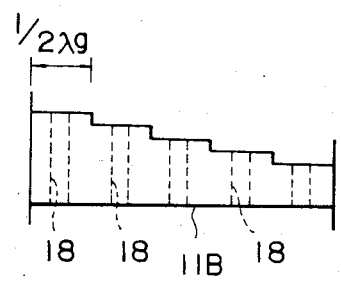
FIGS. 12(a) and 12(b) are diagrams showing a stepped waveguide and a tapered waveguide.
Figure 12B:
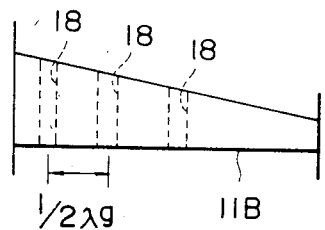

To improve the uniformity, the waveguide 11B may be modified as shown in FIGS. 12(a) and 12(b). As illustrated in FIG. 12(a), the height of the waveguide 11B (the dimension between the upper and the lower walls perpendicular to the electric field) may be reduced stepwise toward the end at a pitch of $\lambda g/2$. The retaining holes 18 of the positioning devices are positioned in the center of each step and made both to be $\lambda g/2$ apart from one another and made to coincide with the peaks of the distribution of the electric field intensity.

In the alternative shown in FIG. 12(b), the waveguide, particularly the height thereof, may be tapered, instead of being stepped as in FIG. 12(a), for the same purpose, i.e., to attain a better uniformity in the electric field and hence in the heating.

The waveguides 11A and 11C may be of a flexible type. In this case, the waveguide 11B can be moved to such a position that the retaining holes 18 are in alignment with the pots of the mold. Thus the flexibility in designing is increased.

Tablets, particularly those having a diameter of not larger than 18 mm have been found to yield satisfactory results. But, the mold resin may not necessarily be in the form of tablets but can alternatively be powders.

Figure 1:
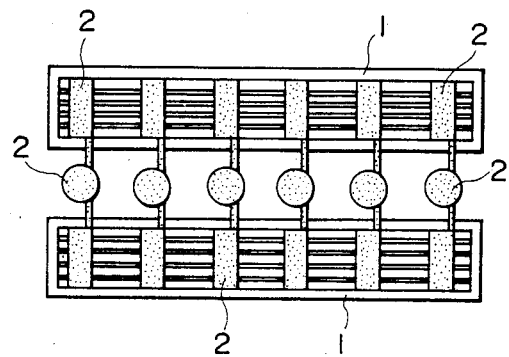
FIG. 1 is a plan view showing molded semiconductor pellets on a lead frame.
Figure 2:
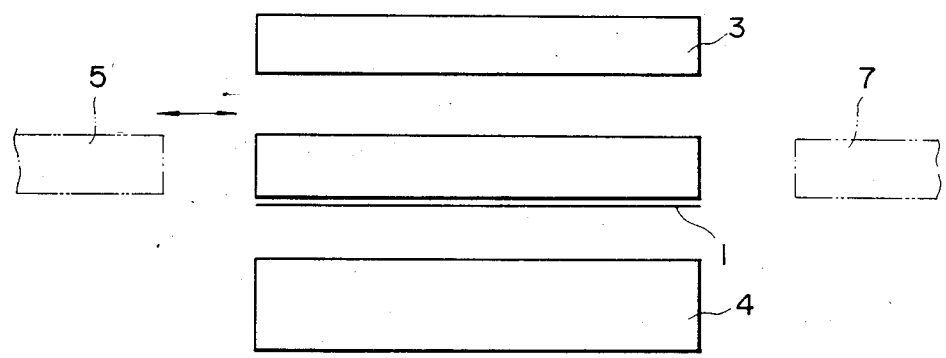
FIG. 2 is an elevational view showing a conventional molding apparatus.
Figure 3:
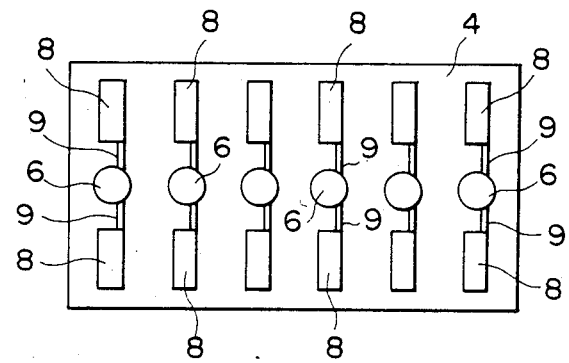
FIG. 3 is a plan view showing an example of a lower mold die.

The mold die may not necessarily be one shown in FIG. 1 where each pot is connected to supply resin to two cavities, but may alternatively one where each pot supplies any other number of (e.g., four) cavities.

As has been described, according to the invention, mold resin is introduced in a waveguide, and dielectric heating is effected by the use of a microwave. As a result, heating is accomplished uniformly and in a short time, regardless of the form of the mold resin (whether it is tablets or powder) and the size of the tablet. Since preheating (heating before introduction into the pots of the mold) can be achieved, the formation (molding) cycle time can be reduced, and chance of occurrence of defective formation can be reduced, and the quality of the resultant product is improved. Moreover, preheating is done by means of a microwave, so that the internal portion of the mold resin is quickly heated. In addition, by having the center of the mold resin positioned at the peak of the distribution of the electric field, the temperature of the central portion can be made higher than the temperature of the outer portion of the resin. This state of the central portion having a higher temperature is ideal in that the temperature of the outer portion can be so selected that deformation of the resin before introduction into the pot of the mold can be avoided. As a result, transfer of the mold die can be avoided. As a result, transfer of process of the handling of the resin up to introduction into the pot can be readily achieved. Furthermore, by having a plurality of positioning devices at the positions of the peaks at the distribution of the electric field, a plurality of supplies of mold resin can be simultaneously preheated. By doing so, the formation cycle time can be further reduced.

What is claimed is:

1. Preheating apparatus for use in a semiconductor molding apparatus for preheating mold resin before the mold resin is charged in a mold die, comprising:
    a microwave generator generating a microwave;
    a waveguide connected to the microwave generator;
    a plurality of positioning devices respectively positioning a plurality of supplies of mold resin, within the waveguide, at the positions of peaks of the distribution, along the length of the waveguide, of the electric field intensity formed by the microwave in the waveguide, each positioning device positioning the mold resin so that the center of the mold resin coincides with the position of a peak of the distribution of the electric field intensity; and
    means for permitting introduction of the mold resin from outside of the waveguide into each of the positioning devices and discharge of the mold resin from each of the positioning devices to the outside of the waveguide,
    wherein walls of the waveguide perpendicular to the electric field due to the microwave are provided with perforations and each of the positioning devices comprises a cylindrical retainer extending through the waveguide and fitted in a respective one of the perforations, the inner surface of the cylindrical retainer defining a retaining hole for accommodating and positioning the mold resin.

2. Apparatus according to claim 1, wherein a circulator is provided to connect the waveguide in such a manner that the microwave reflected from the end of the waveguide is directed away from the microwave generator.

3. Apparatus according to claim 1, wherein one end of the cylindrical retainer is open to permit introduction of the mold resin into the retaining hole.

4. Apparatus according to claim 3, wherein a shutter is provided at the other end of the cylindrical retainer to permit discharge of the mold resin out of the retaining hole.

5. Apparatus according to claim 1, wherein a choke is provided in alignment with each of the cylindrical retainers on the outer surfaces of the walls of the waveguide perpendicular to the electric field due to the microwave thereby to prevent leakage of the microwave.

6. Apparatus according to claim 1, wherein an end of the waveguide forms a perfect reflection end for the propagating microwave so that a standing wave is produced, and each of the positioning devices positions the center of the mold resin at the position of a maximum value of the distribution of the electric field intensity along the lateral direction of the waveguide and at the position of an antinode of the standing wave.

7. Apparatus according to claim 1, wherein an end of the waveguide is formed of a reflectionless terminator.

8. Apparatus according to claim 7, wherein that portion of the waveguide close to its end is tapered in such a manner that the distance between the walls of the waveguide perpendicular to the electric field is gradually decreased toward the end of the waveguide.

9. Apparatus according to claim 7, wherein that portion of the waveguide close to its end is stepped in such a manner that the distance between the walls of the waveguide is gradually decreased stepwise toward the end of the waveguide.

10. Apparatus according to claim 1, wherein the mold resin is in the form of a tablet.

11. Apparatus according to claim 10, wherein the tablet is, of a diameter of not larger than about 18 mm.

12. Apparatus according to claim 1, wherein the mold resin is in the form of powder.

* * * * *